(12) United States Patent
Qi et al.

(10) Patent No.: US 9,635,112 B2
(45) Date of Patent: Apr. 25, 2017

(54) APPARATUS, SYSTEM AND METHOD OF MANAGING AN APPLICATION SERVICE PLATFORM (ASP) SESSION

(71) Applicant: Intel Corporation, Santa Clara, CA (US)

(72) Inventors: Emily H. Qi, Portland, OR (US); Carlos Cordeiro, Portland, OR (US); Bahareh (Bahar) Sadeghi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 375 days.

(21) Appl. No.: 14/013,153

(22) Filed: Aug. 29, 2013

(65) Prior Publication Data

US 2014/0330927 A1 Nov. 6, 2014

Related U.S. Application Data

(60) Provisional application No. 61/818,817, filed on May 2, 2013.

(51) Int. Cl.
*G06F 15/16* (2006.01)
*H04L 29/08* (2006.01)
(Continued)

(52) U.S. Cl.
CPC ............ *H04L 67/14* (2013.01); *H04W 76/06* (2013.01); *H04W 76/062* (2013.01); *H04W 76/043* (2013.01)

(58) Field of Classification Search
CPC .. H04W 76/062; H04W 76/043; H04W 76/06
See application file for complete search history.

(56) References Cited

U.S. PATENT DOCUMENTS

2004/0019619 A1   1/2004 Buer et al.
2005/0147243 A1   7/2005 Baek
(Continued)

FOREIGN PATENT DOCUMENTS

WO   2011062404   5/2011
WO   2012096546   7/2012
WO   2012060611   10/2012

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
(Continued)

*Primary Examiner* — Arvin Eskandarnia
(74) *Attorney, Agent, or Firm* — Shichrur & Co.

(57) ABSTRACT

Some demonstrative embodiments include apparatuses, systems and/or methods of managing an Application Service Platform (ASP) session. For example, an apparatus may include a first ASP to communicate with a second ASP via a wireless Peer-to-Peer (P2P) connection over a P2P link to manage an ASP-session between a first device including the first ASP and a second device including the second ASP. The first ASP may communicate with the second ASP a message to close the ASP-session, the message including a reason field including an indication of a reason for closing the ASP-session.

30 Claims, 3 Drawing Sheets

(51) Int. Cl.
*H04W 76/06* (2009.01)
*H04W 76/04* (2009.01)

(56) References Cited

U.S. PATENT DOCUMENTS

| | | | |
|---|---|---|---|
| 2007/0230695 A1 | 10/2007 | Sefzik et al. | |
| 2009/0157814 A1 | 6/2009 | Lee et al. | |
| 2011/0075643 A1* | 3/2011 | Natan | H04W 48/18 370/338 |
| 2012/0134349 A1 | 5/2012 | Jung et al. | |
| 2012/0162479 A1 | 6/2012 | Okamura | |
| 2012/0195196 A1* | 8/2012 | Ghai | H04W 28/24 370/235 |
| 2014/0351445 A1* | 11/2014 | Davidson | H04L 65/1069 709/227 |
| 2015/0173001 A1* | 6/2015 | Huang | H04L 67/16 370/254 |
| 2015/0206190 A1* | 7/2015 | Lee | H04W 48/16 705/14.64 |
| 2015/0351146 A1* | 12/2015 | Lee | H04W 76/023 370/329 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
Wi-Fi Alliance Technical Committee P2P Task Group; Wi-Fi Peer-to-Peer (P2P) Technical Specification; Version 1.2; Dec. 14, 2011; 160 pages.
Office Action for U.S. Appl. No. 15/088,133, mailed on Sep. 6, 2016, 16 pages.
International Search Report and Written Opinion for PCT/US2014/036299, mailed on Mar. 8, 2016, 7 pages.
International Preliminary Report on Patentability for PCT/US2014/036299, mailed on Mar. 24, 2016, 6 pages.
Notice of Allowance for U.S. Appl. No. 15/088.133, mailed on Jan. 13, 2017, 9 pages.

* cited by examiner

APPARATUS, SYSTEM AND METHOD OF MANAGING AN APPLICATION SERVICE PLATFORM (ASP) SESSION

CROSS REFERENCE

This application claims the benefit of and priority from U.S. Provisional Patent Application No. 61/818,817 entitled "Method of reject reason for WFDS ASP-session management", filed May 2, 2013, the entire disclosure of which is incorporated herein by reference.

TECHNICAL FIELD

Embodiments described herein generally relate to an apparatus, system and method of managing an application service platform (ASP) session.

BACKGROUND

A first wireless communication device may be capable of providing one or more services to a second wireless communication device. For example, the first wireless communication device may provide printing services, display services, Internet access services, and/or any other service to the second wireless communication device.

Wireless Fidelity (Wi-Fi) Direct technology provides a Peer-to-Peer (P2P) connectivity to connect between the first and second devices, e.g., to share, show, print, and/or synchronize content.

The Wi-Fi Direct technology provides link-layer connectivity, which may not support interoperability between services and/or applications from multiple, e.g., different, vendors. As a result, users may experience inconsistency when using a service from a remote device, e.g., due to the lack of interoperability between a device providing services and a device running applications and/or a complexity of the P2P topology.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
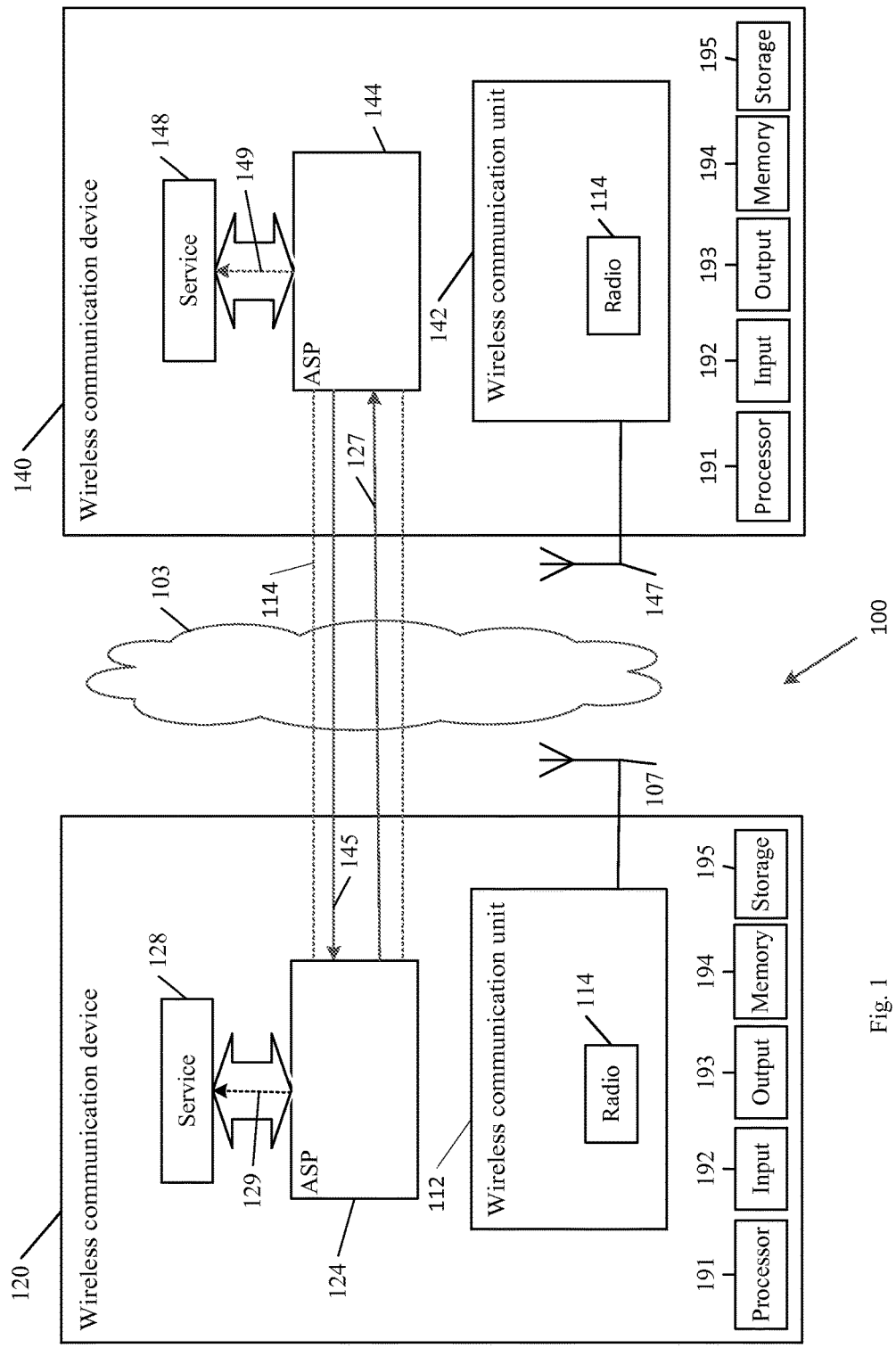
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; *IEEE*802.11 *task group ac* (*TGac*) ("*IEEE*802.11-09/0308r12—*TGac Channel Model Addendum Document*"); *IEEE* 802.11 *task group ad* (*TGad*)

(*IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band,* 28 *Dec.* 2012)) and/or future versions and/or derivatives thereof, devices and/or networks operating in accordance with existing WirelessHD™ specifications and/or future versions and/or derivatives thereof, devices and/or networks operating in accordance with existing WiFi Alliance (WFA) Peer-to-Peer (P2P) specifications (WiFi P2P technical specification, version 1.3, 2012) and/or future versions and/or derivatives thereof, devices and/or networks operating in accordance with existing Wireless Serial Bus (WSB) specifications and/or future versions and/or derivatives thereof units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 120 and/or 140, capable of communicating content, data, information and/or signals over a wireless communication medium (WM) 103, for example, a radio channel, an IR channel, an RF channel, a Wireless Fidelity (WiFi) channel, and the like. One or more elements of system 100 may optionally be capable of communicating over any suitable wired communication links.

In some demonstrative embodiments, wireless communication devices 120 and/or 140 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 120 and/or 140 may include wireless communication units 112 and/or 142, respectively, to perform wireless communication between wireless communication devices 120 and/or 140 and/or with one or more other wireless communication devices, e.g., as described below.

In some demonstrative embodiments, wireless communication devices 120 and/or 140 may also include, for example, one or more of a processor 191, an input unit 192, an output unit 193, a memory unit 194, and a storage unit 195. Wireless communication devices 120 and/or 140 may optionally include other hardware components and/or software components. In some demonstrative embodiments, some or all of the components of one or more of wireless communication devices 120 and/or 140 may be enclosed in a common housing or packaging, and may be interconnected or operably associated using one or more wired or wireless links. In other embodiments, components of one or more of wireless communication devices 120 and/or 140 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 120 and/or 140 and/or of one or more applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 120 and/or 140.

In some demonstrative embodiments, wireless communication units 112 and/or 142 may include, or may be associated with, one or more antennas 107 and/or 147, respectively. Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a single element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication units 112 and/or 142 include, for example, one or more radios 114, e.g., including one or more wireless transmitters, receivers and/or transceivers able to send and/or receive wireless communication signals, RF signals, frames, blocks, transmission streams, packets, messages, data items, and/or data. For example, wireless communication units 112 and/or 142 may include or may be implemented as part of a wireless Network Interface Card (NIC), and the like.

In some demonstrative embodiments, wireless communication medium 103 may include a wireless P2P link. For example, devices 102 and/or 140 may perform the functionality of P2P clients.

In some demonstrative embodiments, wireless communication medium 103 may include a WiFi direct link.

In some demonstrative embodiments, wireless communication medium 103 may include any other suitable link.

In some demonstrative embodiments, devices 120 and/or 140 may be configured to provide one or more services to one or more remote devices. For example, device 120 may be configured to provide printing services, display services, Internet access services and/or any other services to device 140.

In some demonstrative embodiments, devices 120 and/or 140 may be configured to advertize the one or more services, for example, to enable the remote devices to find the services. For example, device 120 may be configured to advertise one or more of the services provided by device 120 to enable device 140 to discover the services provided by device 120.

In some demonstrative embodiments, devices 120 and/or 140 may be configured to utilize the one or more services from the remote devices. For example, device 140 may be configured to utilize the services from device 120.

In some demonstrative embodiments, devices 120 and/or 140 may be configured to connect to a device to receive the service provided by the device. For example, device 140 may be configured to connect to device 120 to receive the services provided by device 120.

In some demonstrative embodiments, devices 120 and 140 may establish a P2P connection between devices 120 and 140 over wireless communication medium 103 to connect between devices 120 and 140, and to provide the one or more services between devices 120 and 140.

In some demonstrative embodiments, devices 120 and 140 may establish any other connection between devices 120 and 140 over wireless communication medium 103.

In some demonstrative embodiments, devices 120 and/or 140 may include an Application Service Platform (ASP) configured to manage the procedure of receiving and/or providing the one or more services, e.g., according to a predefined protocol.

In some demonstrative embodiments, device 120 may include an ASP 124, and/or device 140 may include an ASP 144, configured to manage an ASP-session between devices 120 and 140.

In some demonstrative embodiments, ASP 124 and/or ASP 144 may include a software module and/or a library module that implements functions required for managing the procedure of receiving and/or providing the one or more services. For example, the functions may include discovery of a service, session management, connection topology management, security management and/or any other function to support management of the services.

In some demonstrative embodiments, ASP 124 and ASP 144 may be configured to establish one or more ASP-sessions between devices 120 and 140 over the P2P connection. The ASP-session may be utilized, for example, to provide the one or more services between devices 120 and 140.

In some demonstrative embodiments, ASP 124 and/or ASP 144 may not be able to establish the one or more ASP-sessions, for example, if devices 120 and/or 140 do not establish the P2P connection between devices 120 and/or 140, e.g., prior to establishing the ASP-sessions.

In some demonstrative embodiments, an ASP-session may include a logical link between ASP 124 and 144, e.g., over the P2P connection between devices 120 and 140. The ASP-session may be configured, for example, to manage the procedure of providing a service between devices 120 and 140.

In some demonstrative embodiments, the ASP-session may be identified by an identifier ("ASP-session identifier").

In some demonstrative embodiments, the ASP-session identifier may be unique, e.g., different, for every ASP-session. For example, a first ASP session may be identified by a first ASP-session identifier, and a second ASP-session may be identified by a second, e.g., different, ASP-session identifier.

In some demonstrative embodiments, the ASP-session identifier may include a combination of one or more elements to identify the ASP-session.

In some demonstrative embodiments, the ASP-session identifier may include a combination of a session media access control (MAC) address and a session identifier.

In some demonstrative embodiments, the session MAC address may include MAC address of a device initiating the ASP-session ("the seeker device").

In some demonstrative embodiments, the session identifier may include a value generated by the seeker device.

In some demonstrative embodiments, the seeker device may generate a different, e.g., unique, value for the session identifier for every ASP-session initiated by the seeker device. Accordingly, the unique value for the session identifier and the session MAC address may form the unique ASP-session identifier for every ASP-session.

In one example, ASP 124 and ASP 144 may establish a first ASP-session over the P2P connection to provide a first service between devices 120 and/or 140, e.g., a printing service; a second ASP-session over the P2P connection to provide a second, e.g., different, service between devices 120 and/or 140, e.g., a display service; and/or one or more other ASP-sessions over the P2P connection to provide one or more other services between devices 120 and/or 140. According to this example, each ASP-session may be identified by a different unique session identifier generated by device 140 and the MAC address of device 140, for example, if device 140 initiates the ASP-sessions.

In other embodiments, the ASP-session identifier may include any other identifier and/or any one or more other values.

In some demonstrative embodiments, device 120 may include at least one service 128, e.g., a printing service and/or any other service, configured to be provided to another device, e.g., device 140.

In some demonstrative embodiments, service 128 may include a logical entity, which may utilize ASP 124 and/or 144 to provide use case functionalities to other services or applications. A service on one device may communicate with a service on one or more devices using a common protocol defined in each service and the ASP. For example, service 128 may utilize ASP 124 and/or ASP 144 to provide printing functionalities to at least one application 148.

In some demonstrative embodiments, device 140 may include at least one application 148, e.g., a browser and/or any other application, configured to use a remote service, e.g., service 128.

In some demonstrative embodiments, application 148 may include a software process having a user interface, which a user may employ to accomplish a task, e.g., web browsing, instant messaging, sending a file and/or streaming media. For example, a user of application 148 may utilize application 148 for the task of web browsing.

In some demonstrative embodiments, device 120 may advertise service 128 to enable another device, e.g., device 140, to discover service 128.

In some demonstrative embodiments, device 140 may receive the advertisement of service 128.

In some demonstrative embodiments, ASP 124 may communicate with ASP 144 over the P2P connection over WM 103 to manage an ASP-session 114 between ASP 124 and ASP 144.

In some demonstrative embodiments, ASP 124 and ASP 144 may manage ASP-session 114 to enable and/or to manage usage of service 128 by application 148, for example, to enable the browser to print content of a webpage.

In some demonstrative embodiments, ASP 144 may request ASP 124 to open ASP-session 114.

In some demonstrative embodiments, ASP 144 may transmit to ASP 124, e.g., via the P2P connection, a request-session message 145 to request to open ASP-session 114, for example, upon a request from application 148 to use service 128.

In some demonstrative embodiments, request-session message 145 may include an ASP-session identifier of ASP-session 114.

In some demonstrative embodiments, request-session message 145 may include a combination of a session MAC address and a session identifier to identify ASP-session 114. For example, request-session message 145 may include the MAC address of device 140 and a unique session identifier generated by device 140, e.g., as described above.

In some demonstrative embodiments, request-session message 145 may include an advertisement identification of an advertised service advertised by device 120 and requested by device 140. For example, message 145 may include an advertisement identification indicating service 128.

In some demonstrative embodiments, ASP 124 may receive request-session message 145 from ASP 144 and may accept the request to open ASP-session 114.

In some demonstrative embodiments, ASP 124 may open ASP-session 114, for example, by opening one or more ports or sockets between devices 120 and 140.

In some demonstrative embodiments, ASP 124 may transmit to ASP 144 a message 127 to close ASP-session 114.

In some demonstrative embodiments, ASP 124 may transmit message 127 to remove ASP-session 114.

In some demonstrative embodiments, ASP 124 may remove ASP-session 114, e.g., after opening ASP session 114, for various reasons, e.g., as described below.

In one example, ASP 124 may remove ASP-session 114, for example, due to a system failure of device 120.

In another example, ASP 124 may remove ASP-session 114, for example, if the wireless P2P link between devices 120 and 140 is unavailable.

In another example, ASP 124 may remove ASP-session 114 for any other reason.

In some demonstrative embodiments, ASP 124 may transmit message 127 to ASP 144 to reject ASP session 114.

In some demonstrative embodiments, ASP 124 may transmit message 127, e.g., in response to message 145, to reject the request of ASP 144 to open ASP-session 114.

In some demonstrative embodiments, ASP 124 may reject the request to open ASP-session 114, e.g., upon receiving message 145, for various reasons, e.g., as described below.

In one example, ASP 124 may reject the request to open ASP-session 114, for example, if service 128 is unavailable.

In another example, ASP 124 may reject the request to open ASP-session 114, for example, if a user of device 140 rejects the request to open ASP-session 114.

In another example, ASP 124 may reject ASP-session 114 for any other reason.

In some demonstrative embodiments, ASP 144 may receive message 127 from ASP 124 and may close ASP-session 114.

In some demonstrative embodiments, ASP 144 may not be aware of the reason for closing ASP-session 114, for example, if message 127 does not include the reason for closing ASP-session 114.

Some demonstrative embodiments may enable indicating to ASP 124 the reason of closing ASP-session 114, e.g., as described below.

Some demonstrative embodiments may enable a first ASP to provide to a second ASP information relating to the reason for closing ASP-session 114. For example, ASP 124 may provide to ASP 124 information ("the reason indication") relating to the reason for closing ASP-session 114, e.g., as described below.

Some demonstrative embodiments may enable providing the reason indication to one or more additional elements. For example, ASP 144 may provide the reason indication to application 148; and/or ASP 124 may provide the reason indication to service 128, e.g., as described below.

In some demonstrative embodiments, message 127 may include a reason field including an indication of a reason for closing ASP-session 114.

In some demonstrative embodiments, message 127 may include the reason for ASP 124 closing ASP-session 114.

In some demonstrative embodiments, the reason field may include a value selected from a predefined set of values representing a predefined set of reasons for closing ASP-session 114.

In some demonstrative embodiments, the predefined set of reasons for closing ASP-session 114 may include a first reason, e.g., rejected by user, a second reason, e.g., advertised service is not available, a third reason, e.g., system failure, and a fourth reason, e.g., P2P link is not available.

In some demonstrative embodiments, the predefined set of reasons for closing ASP-session 114 may include one or more additional or alternative predefined reasons, for example, unknown, undefined, and/or any other reason.

In one example, ASP 124 may select the value indicating the "rejected by user" reason, for example, if a user of device 120 rejected the session-request to open ASP-session 114

In another example, ASP 124 may select the value indicating the "advertised service is not available" reason, for example, if service 128 is and/or becomes unavailable.

In another example, ASP 124 may select the value indicating the "system failure" reason, for example, if device 120 experiences a system failure.

In another example, ASP 124 may select the value indicating the "P2P link is not available" reason, for example, if the P2P connection over WM 103 is disconnected.

In some demonstrative embodiments, message 127 may include the unique identifier of ASP-session 114, e.g., the MAC address and the session identifier of request-session message 145, which was communicated between ASP 144 and ASP 124 prior to establishing ASP-session 114.

In some demonstrative embodiments, ASP 144 may receive message 127 including the reason of ASP 124 for closing the ASP-session 114.

In one example, ASP 124 may transmit message 127 to ASP 144 including the value indicating system failure, for example, if ASP 124 closes ASP-session 114 due to system failure of device 120.

In some demonstrative embodiments, ASP 144 may transmit a session status message 149 to application 148 to provide a status of ASP-session 114 to application 148.

In some demonstrative embodiments, ASP 144 may transmit session status message 149, for example, upon closing ASP-session 114.

In some demonstrative embodiments, session status message 149 may indicate the reason for closing ASP-session 114. For example, message 149 may indicate the system failure of device 120 as the reason for closing ASP-session 114, for example, if message 127 indicates the "system failure" reason.

In some demonstrative embodiments, application 148 may receive message 149 including the reason for closing ASP-session 114, and may operate accordingly.

In one example, application 148 may receive message 149 including the indication of system failure of device 120. Accordingly, application 148 may wait for the system of device 120 to recover from the failure and/or device 140 may search for another device to provide the printing service to application 148.

In another example, application 148 may receive message 149 including an indication that the ASP-session request was rejected by the user of device 120. Accordingly, device 140 may search for another device to provide the printing service to application 148.

In some demonstrative embodiments, ASP 124 may transmit a session status message 129 to service 128, e.g., to provide the status of ASP-session 114 to service 128.

In some demonstrative embodiments, ASP 124 may transmit session status message 129, for example, upon closing ASP-session 114.

In some demonstrative embodiments, session status message 129 may indicate the reason for closing ASP-session 114. For example, message 129 may indicate the system failure of device 120 as the reason for closing ASP-session 114.

In some demonstrative embodiments, request-session message 145 and/or message 127 may include ASP coordination protocol messages.

In some demonstrative embodiments, message 127 may include a remove-session message, for example, if ASP 124 transmits message 127 to remove ASP-session 114, for example, after opening ASP-session 114.

In one example, ASP 124 may transmit message 127 including the remove session message including the reason field indicating the system failure of device 120, for example, if the system failure occurs after opening ASP-session 114.

In some demonstrative embodiments, message 127 may include a reject-session message, for example, if ASP 124 transmits message 127 to reject the request of ASP 144 to open ASP-session 114.

In one example, ASP 124 may transmit message 127 including the reject-session message including the reason field indicating the advertised service is unavailable, for example, if service 128 is unavailable, for example, when ASP 124 receives the request to open ASP-session 114.

In some demonstrative embodiments, message 127 may include one or more predefined fields, e.g., as follows:

TABLE 1

| Field | Size (octets) | Value | Description |
| --- | --- | --- | --- |
| Opcode | 1 | 0x02 or 0x03 | Opcode as defined |
| Sequence number | 1 | variable | Sequence number is assigned at transmission time. |
| session_mac | 6 | variable | MAC address used in combination with the session_id to uniquely identify an ASP-Session. This value is received in a previous REQUEST_SESSION message |

TABLE 1-continued

| Field | Size (octets) | Value | Description |
| --- | --- | --- | --- |
| session_id | 4 | variable | ID used in combination with session_mac to uniquely identify an ASP-Session. This value is received in a previous REQUEST_SESSION message |
| Reject reason code | 1 | variable | Reject reason code indicates reject reason. It is defined as one of following values:<br>0: unknown<br>1: undefined<br>2: advertised service is not available<br>3: P2P link is not available<br>4. System failure<br>5-255: reserved. |

In some demonstrative embodiments, the Opcode field may indicate the type of message 127. For example, the Opcode of 0–02 may indicate the rejected-session message and/or the Opcode of 0–03 may indicate the remove-session message.

As indicated by Table 1, the session_mac field and session_id field may include the session MAC address and the session identifier, e.g., the unique identifier, of a request-session message, e.g., request-session message 145, transmitted to request to open ASP-session 114, e.g., as described above.

As indicated by Table 1, the rejected-session message and/or the remove-session message may include the reason field indicating the reason of closing ASP-session 114. The reason field may include a value selected from the pre-defined set of values representing the predefined set of reasons, e.g., as described above.

In some demonstrative embodiments, providing the reason of closing ASP-session 114 to ASP 124 may improve interoperability between services and applications, e.g., service 128 and application 131.

In some demonstrative embodiments, improving the interoperability may increase consistency of user experience, for example, when utilizing one or more services from one or more remote devices.

Figure 2:
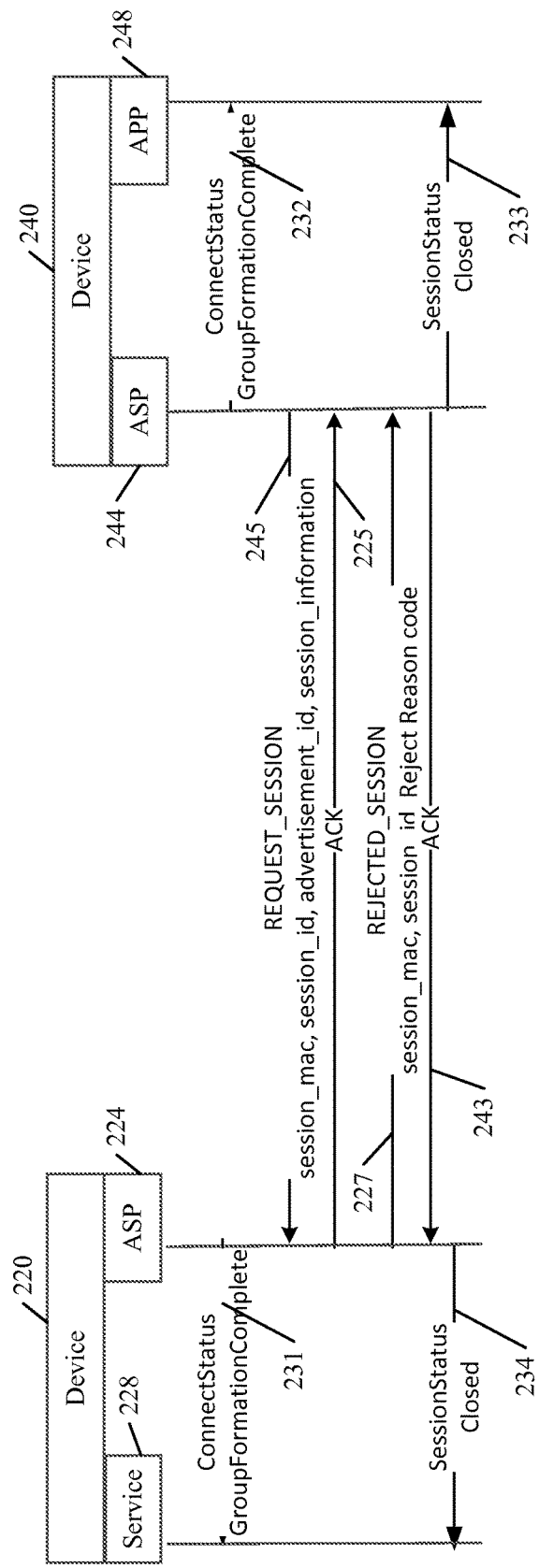
FIG. 2 is a sequence diagram of operations between a first wireless communication device and a second wireless communication device, in accordance with some demonstrative embodiments.

Reference is made to FIG. 2, which schematically illustrates a sequence of operations between a first wireless communication device 220 and a second wireless communication device 240, in accordance with some demonstrative embodiments. For example, device 220 may perform the functionality of device 120 (FIG. 1) and/or device 240 may perform the functionality of device 140 (FIG. 1).

As shown in FIG. 2, devices 220 and 240 may communicate via an ASP 224 and an ASP 244. For example, ASP 224 may perform the functionality of ASP 124 (FIG. 1) and/or ASP 244 may perform the functionality of ASP 144 (FIG. 1).

As shown in FIG. 2, device 220 may include a service 228, and/or device 240 may include an application 248 configured to use service 228. For example, service 228 may perform the functionality of service 128 (FIG. 1) and/or application 248 may perform the functionality of application 148 (FIG. 1).

As shown in FIG. 2, ASP 224 may notify (231) service 228 of establishing of a P2P connection between devices 220 and 240; and/or ASP 244 may notify (232) application 148 of the establishing of the P2P connection between devices 220 and 240.

In some demonstrative embodiments, ASP 244 may request to open an ASP session between devices 240 and 220, e.g., to manage the providing of service 228 to application 248.

As shown in FIG. 2, ASP 244 may transmit a request-session message 245 to request to open the ASP session. For example, request-session message 245 may perform the functionality of request-session message 145 (FIG. 1).

As shown in FIG. 2, request-session message 245 may include a session_mac field, a session_id field, an advertisement_id field and a session_information field. For example, session_mac field may include the MAC address of device 240, session_id field may include a unique value generated by device 240 and/or the advertisement_id field may include an indication of service 228.

As shown in FIG. 2, ASP 224 may transmit an acknowledge (ACK) message 225 to acknowledge receipt of request-session message 245.

In some demonstrative embodiments, ASP 224 may reject the session request requested by request-session message 245.

As shown in FIG. 2, ASP 224 may transmit a rejected-session message 227 to reject session request 245. For example, rejected-session message 227 may perform the functionality of message 127 (FIG. 1).

As shown in FIG. 2, rejected-session message 227 may include a session_mac field, a session_id field, and a reject reason code. For example, the session_mac field may include the MAC address of device 240; the session_id field may include a session identifier generated by device 240, e.g., as described above; and/or the reject reason code field may include a value indicting the reason of rejecting the session request, e.g., according to Table 2.

As shown in FIG. 2, ASP 244 may transmit an ACK message 243 to acknowledge receipt of rejected-session message 227.

As shown in FIG. 2, ASP 244 may send a session status message 233 to application 248 to notify application 248 of the closing of the ASP session between ASP 224 and ASP 244. For example, session status message 233 may perform the functionality of session status message 149 (FIG. 1).

In some demonstrative embodiments, session status message 233 may include an indication of the reason of rejecting the session request.

As shown in FIG. 2, ASP 224 may send a session status message 234 to service 228 to notify service 228 of the closing of the ASP session between ASP 224 and ASP 244. For example, session status message 234 may perform the functionality of session status message 129 (FIG. 1).

In some demonstrative embodiments, session status message 234 may include an indication of the reason of rejecting the session request.

In one example, device 240 may transmit request-session message 245 to device 220 to request to open the ASP-session to utilize, e.g., by application 248, a printing service provided by device 240. Device 220 may receive message 245, and may reject the request to open the ASP session, for example, if the printing service is currently unavailable at device 220. ASP 224 may transmit rejected-session message 227 to device 240 including the reject reason code indicating that the printing service is unavailable. Device 240 may receive message 227 and may notify application 248, e.g., using session status message 233, that the printing service of device 220 is unavailable.

Figure 3:
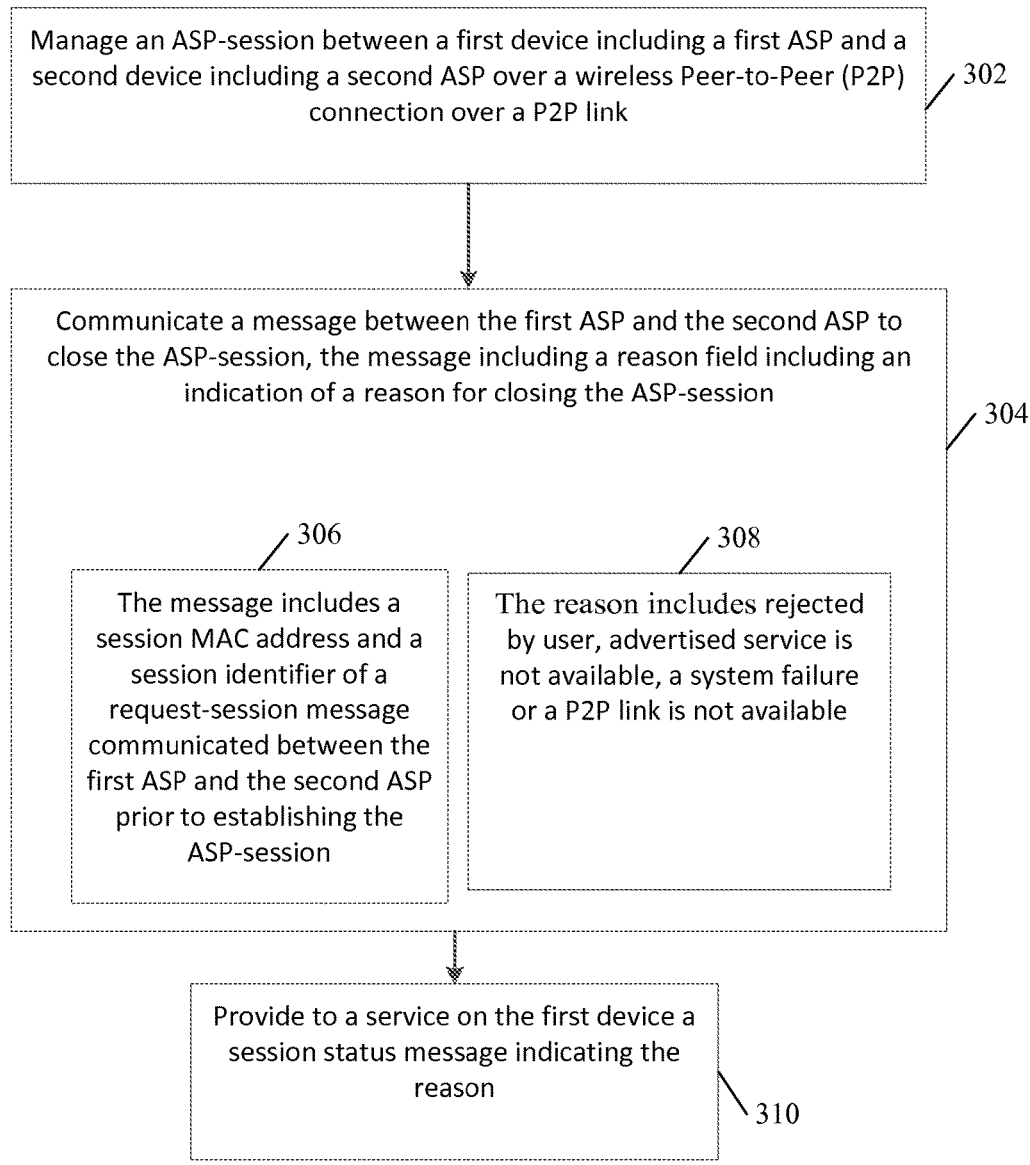
FIG. 3 is a flow chart illustration of a method of managing an application service platform (ASP) session, in accordance with some demonstrative embodiments.

Reference is made to FIG. 3, which schematically illustrates a flow chart illustration of a method of managing an ASP session, in accordance with some demonstrative embodiments. For example, one or more of the operations of the method of FIG. 3 may be performed by a wireless communication system, e.g., system 100 (FIG. 1); a wireless communication device, e.g., device 120 (FIG. 1) and/or device 140 (FIG. 1); and/or an ASP, e.g., ASP 124 (FIG. 1), and/or ASP 144 (FIG. 1).

As indicated at block 302, the method may include managing an ASP-session between a first device including a first ASP and a second device including a second ASP over a wireless P2P connection over a P2P link. For example, ASP 124 and ASP 144 (FIG. 1) may manage ASP-session 114 (FIG. 1) over the P2P connection, e.g., as described above.

As indicated at block 304, the method may include communicating a message between the first ASP and the second ASP to close the ASP-session. The message may include a reason field including an indication of a reason for closing the ASP-session. For example, ASP 124 (FIG. 1) may transmit to ASP 144 (FIG. 1) message 127 (FIG. 1) including the reason field including the indication of the reason for closing ASP-session 114 (FIG. 1), e.g., as described above.

As indicated at block 306, the message may include a session MAC address and a session identifier of a request-session message communicated between the first ASP and the second ASP prior to establishing the ASP-session. For example, message 127 (FIG. 1) may include the session MAC address and the session identifier of request session message 145 (FIG. 1), e.g., as described above.

As indicated at block 308, the reason for closing the field may include a reason of rejected by user reason, an advertised service is not available reason, a system failure reason, and/or a P2P link is not available reason. For example, message 127 (FIG. 1) may include the reject reason code fields with a value according to Table 2, e.g., as described above.

As indicated at block 310, the method may include providing a session status message to a service on the first device. The status message may indicate the reason for closing the ASP-session. For example, ASP 144 (FIG. 1) may send to application 148 (FIG. 1) message 149 (FIG. 1) indicating the reason for closing ASP-session 114 (FIG. 1), e.g., as described above.

Figure 4:
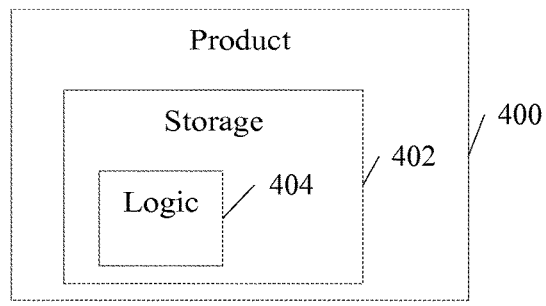
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 140 (FIG. 1), device 160 (FIG. 1), ASP 124 (FIG. 1), ASP 144 (FIG. 1), and/or to perform one or more operations of the method of FIG. 2. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a first Application Service Platform (ASP) to communicate with a second ASP via a wireless Peer-to-Peer (P2P) connection over a P2P link to manage an ASP-session between a first device including the first ASP and a second device including the second ASP, wherein the first ASP is to communicate with the second ASP a message to close the ASP-session, the message including a reason field including an indication of a reason for closing the ASP-session.

Example 2 includes the subject matter of Example 1 and optionally, wherein the reason field includes a value selected from a predefined set of values representing a predefined set of reasons for closing the ASP-session.

Example 3 includes the subject matter of Example 1 or 2 and optionally, wherein the reason comprises a reason selected from the group consisting of rejected by user, advertised service is not available, system failure, and P2P link is not available.

Example 4 includes the subject matter of any one of Examples 1-3 and optionally, wherein the message comprises a session Media Access Control (MAC) address and a session identifier of a request-session message communicated between the first ASP and the second ASP prior to establishing the ASP-session.

Example 5 includes the subject matter of any one of Examples 1-4 and optionally, wherein the first ASP is to transmit the message to the second ASP, the reason includes a reason corresponding to the first device for closing the ASP-session.

Example 6 includes the subject matter of any one of Examples 1-4 and optionally, wherein the first ASP is to receive the message from the second ASP, the reason includes a reason corresponding to the second device for closing the ASP-session.

Example 7 includes the subject matter of Example 6 and optionally, wherein the first ASP is to provide a session status message to a service on the first device, the session status message indicating the reason.

Example 8 includes the subject matter of any one of Examples 1-7 and optionally, wherein the message comprises an ASP coordination protocol message.

Example 9 includes the subject matter of any one of Examples 1-8 and optionally, wherein the message comprises a remove-session message.

Example 10 includes the subject matter of any one of Examples 1-8 and optionally, wherein the message comprises a rejected-session message.

Example 11 includes the subject matter of any one of Examples 1-10 and optionally, wherein the P2P link comprises a Wireless-Fidelity (WiFi) Direct link.

Example 12 includes a system of wireless communication, the system comprising a first wireless communication device including a wireless communication unit to communicate with a second wireless communication device over a wireless Peer to Peer (P2P) link; and a first Application Service Platform (ASP) to communicate with a second ASP via a wireless P2P connection over the wireless P2P link to manage an ASP-session between the first wireless communication device and the second wireless communication device, wherein the first ASP is to communicate with the second ASP a message to close the ASP-session, the message including a reason field including an indication of a reason for closing the ASP-session.

Example 13 includes the subject matter of Example 12 and optionally, wherein the reason field includes a value selected from a predefined set of values representing a predefined set of reasons for closing the ASP-session.

Example 14 includes the subject matter of Example 12 or 13 and optionally, wherein the reason comprises a reason selected from the group consisting of rejected by user, advertised service is not available, system failure, and P2P link is not available.

Example 15 includes the subject matter of any one of Examples 12-14 and optionally, wherein the message comprises a session Media Access Control (MAC) address and a session identifier of a request-session message communicated between the first ASP and the second ASP prior to establishing the ASP-session.

Example 16 includes the subject matter of any one of Examples 12-15 and optionally, wherein the first ASP is to transmit the message to the second ASP, the reason includes a reason corresponding to the first device for closing the ASP-session.

Example 17 includes the subject matter of any one of Examples 12-15 and optionally, wherein the first ASP is to receive the message from the second ASP, the reason includes a reason corresponding to the second device for closing the ASP-session.

Example 18 includes the subject matter of Example 17 and optionally, wherein the first ASP is to provide a session status message to a service on the first device, the session status message indicating the reason.

Example 19 includes the subject matter of any one of Examples 12-18 and optionally, wherein the message comprises an ASP coordination protocol message.

Example 20 includes the subject matter of any one of Examples 12-19 and optionally, wherein the message comprises a remove-session message.

Example 21 includes the subject matter of any one of Examples 12-19 and optionally, wherein the message comprises a rejected-session message.

Example 22 includes the subject matter of any one of Examples 12-21 and optionally, wherein the P2P link comprises a Wireless-Fidelity (WiFi) Direct link.

Example 23 includes a method of wireless communication, the method comprising managing an Application Service Platform (ASP) session (ASP-session) between a first device including a first ASP and a second device including a second ASP via a wireless Peer-to-Peer (P2P) connection over a P2P link; and communicating a message between the first ASP and the second ASP to close the ASP-session, the message including a reason field including an indication of a reason for closing the ASP-session.

Example 24 includes the subject matter of Example 23 and optionally, wherein the reason field includes a value selected from a predefined set of values representing a predefined set of reasons for closing the ASP-session.

Example 25 includes the subject matter of Example 23 or 24 and optionally, wherein the reason comprises a reason selected from the group consisting of rejected by user, advertised service is not available, system failure, and P2P link is not available.

Example 26 includes the subject matter of any one of Examples 23-25 and optionally, wherein the message comprises a session Media Access Control (MAC) address and a session identifier of a request-session message communicated between the first ASP and the second ASP prior to establishing the ASP-session.

Example 27 includes the subject matter of any one of Examples 23-26 and optionally, comprising transmitting the message to the second ASP, the reason includes a reason corresponding to the first device for closing the ASP-session.

Example 28 includes the subject matter of any one of Examples 23-26 and optionally, comprising receiving the message from the second ASP, the reason includes a reason corresponding to the second device for closing the ASP-session.

Example 29 includes the subject matter of Example 28 and optionally, comprising providing a session status message to a service on the first device, the session status message indicating the reason.

Example 30 includes the subject matter of any one of Examples 23-29 and optionally, wherein the message comprises an ASP coordination protocol message.

Example 31 includes the subject matter of any one of Examples 23-30 and optionally, wherein the message comprises a remove-session message.

Example 32 includes the subject matter of any one of Examples 23-30 and optionally, wherein the message comprises a rejected-session message.

Example 33 includes the subject matter of any one of Examples 23-32 and optionally, wherein the P2P link comprises a Wireless-Fidelity (WiFi) Direct link.

Example 34 includes a product including a non-transitory storage medium having stored thereon instructions that, when executed by a machine, result in managing an Application Service Platform (ASP) session (ASP-session) between a first device including a first ASP and a second device including a second ASP via a wireless Peer-to-Peer (P2P) connection over a P2P link; and communicating a message between the first ASP and the second ASP to close the ASP-session, the message including a reason field including an indication of a reason for closing the ASP-session.

Example 35 includes the subject matter of Example 34 and optionally, wherein the reason field includes a value selected from a predefined set of values representing a predefined set of reasons for closing the ASP-session.

Example 36 includes the subject matter of Example 34 or 35 and optionally, wherein the reason comprises a reason selected from the group consisting of rejected by user, advertised service is not available, system failure, and P2P link is not available.

Example 37 includes the subject matter of any one of Examples 34-36 and optionally, wherein the message comprises a session Media Access Control (MAC) address and a session identifier of a request-session message communicated between the first ASP and the second ASP prior to establishing the ASP-session.

Example 38 includes the subject matter of any one of Examples 34-37 and optionally, wherein the instructions result in transmitting the message to the second ASP, the reason includes a reason corresponding to the first device for closing the ASP-session.

Example 39 includes the subject matter of any one of Examples 34-37 and optionally, wherein the instructions result in receiving the message from the second ASP, the reason includes a reason corresponding to the second device for closing the ASP-session.

Example 40 includes the subject matter of Example 39 and optionally, wherein the instructions result in providing a session status message to a service on the first device, the session status message indicating the reason.

Example 41 includes the subject matter of any one of Examples 34-40 and optionally, wherein the message comprises an ASP coordination protocol message.

Example 42 includes the subject matter of any one of Examples 34-41 and optionally, wherein the message comprises a remove-session message.

Example 43 includes the subject matter of any one of Examples 34-41 and optionally, wherein the message comprises a rejected-session message.

Example 44 includes the subject matter of any one of Examples 34-43 and optionally, wherein the P2P link comprises a Wireless-Fidelity (WiFi) Direct link.

Example 45 includes an apparatus of wireless communication, the apparatus comprising means for managing an Application Service Platform (ASP) session (ASP-session) between a first device including a first ASP and a second device including a second ASP via a wireless Peer-to-Peer (P2P) connection over a P2P link; and means for communicating a message between the first ASP and the second ASP to close the ASP-session, the message including a reason field including an indication of a reason for closing the ASP-session.

Example 46 includes the subject matter of Example 45 and optionally, wherein the reason field includes a value selected from a predefined set of values representing a predefined set of reasons for closing the ASP-session.

Example 47 includes the subject matter of Example 45 or 46 and optionally, wherein the reason comprises a reason selected from the group consisting of rejected by user, advertised service is not available, system failure, and P2P link is not available.

Example 48 includes the subject matter of any one of Examples 45-47 and optionally, wherein the message comprises a session Media Access Control (MAC) address and a session identifier of a request-session message communicated between the first ASP and the second ASP prior to establishing the ASP-session.

Example 49 includes the subject matter of any one of Examples 45-48 and optionally, comprising means for transmitting the message to the second ASP, the reason includes a reason corresponding to the first device for closing the ASP-session.

Example 50 includes the subject matter of any one of Examples 45-48 and optionally, comprising means for receiving the message from the second ASP, the reason includes a reason corresponding to the second device for closing the ASP-session.

Example 51 includes the subject matter of Example 50 and optionally, comprising means for providing a session status message to a service on the first device, the session status message indicating the reason.

Example 52 includes the subject matter of any one of Examples 45-51 and optionally, wherein the message comprises an ASP coordination protocol message.

Example 53 includes the subject matter of any one of Examples 45-52 and optionally, wherein the message comprises a remove-session message.

Example 54 includes the subject matter of any one of Examples 45-52 and optionally, wherein the message comprises a rejected-session message.

Example 55 includes the subject matter of any one of Examples 45-54 and optionally, wherein the P2P link comprises a Wireless-Fidelity (WiFi) Direct link.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a memory; and
a processor configured to cause a first Application Service Platform (ASP) to communicate with a second ASP via a wireless Peer-to-Peer (P2P) connection over a P2P link to manage an ASP-session between a first device including said first ASP and a second device including said second ASP,
wherein the processor is configured to cause said first ASP to communicate with said second ASP via the wireless P2P connection a message to close said ASP-session, the message comprises:
an Opcode field having a size of one octet and set to a value 0×03;
a sequence number field having a size of one octet and comprising a sequence number assigned at transmission time;
a session mac field having a size of six octets and comprising a session Media Access Control (MAC) address;
a session id field having a size of four octets and comprising a session identifier (id); and
a reason field having a size of one octet and comprising an indication of a reason for closing said ASP-session.

2. The apparatus of claim 1, wherein said reason field includes a value selected from a predefined set of values representing a predefined set of reasons for closing said ASP-session.

3. The apparatus of claim 1, wherein said reason comprises a reason selected from the group consisting of rejected by user, advertised service is not available, system failure, and P2P link is not available.

4. The apparatus of claim 1, wherein said session MAC address and said session identifier are included in a request-session message communicated between said first ASP and said second ASP prior to establishing said ASP-session.

5. The apparatus of claim 1, wherein said processor is to cause said first ASP to generate and transmit said message to said second ASP, said reason includes a reason corresponding to said first device for closing said ASP-session.

6. The apparatus of claim 1, wherein said processor is configured to cause said first ASP to process said message received from said second ASP, said reason includes a reason corresponding to said second device for closing said ASP-session.

7. The apparatus of claim 6, wherein said processor is to cause said first ASP to provide a session status message to a service on said first device, said session status message indicating said reason.

8. The apparatus of claim 1, wherein said message comprises an ASP coordination protocol message.

9. The apparatus of claim 1, wherein said message comprises a remove-session message.

10. The apparatus of claim 1, wherein said message comprises a rejected-session message.

11. The apparatus of claim 1, wherein said P2P link comprises a WiFi Direct link.

12. A system comprising:
a first wireless communication device including:
a wireless communication unit to communicate with a second wireless communication device over a wireless Peer to Peer (P2P) link; and
a processor configured to cause a first Application Service Platform (ASP) to communicate with a second ASP via a wireless P2P connection over said wireless P2P link to manage an ASP-session between said first wireless communication device and said second wireless communication device,
a. wherein the processor is configured to cause said first ASP to communicate with said second ASP via the wireless P2P connection a message to close said ASP-session, the message comprising:
an Opcode field having a size of one octet and set to a value 0×03;
a sequence number field having a size of one octet and comprising a sequence number assigned at transmission time;
a session mac field having a size of six octets and comprising a session Media Access Control (MAC) address;
a session id field having a size of four octets and comprising a session identifier (id); and a reason field having a size of one octet and comprising an indication of a reason for closing said ASP-session.

13. The system of claim 12, wherein said reason field includes a value selected from a predefined set of values representing a predefined set of reasons for closing said ASP-session.

14. The system of claim 12, wherein said reason comprises a reason selected from the group consisting of rejected by user, advertised service is not available, system failure, and P2P link is not available.

15. The system of claim 12, said wherein said session MAC address and said session identifier are included in a request-session message communicated between said first ASP and said second ASP prior to establishing said ASP-session.

16. The system of claim 12, wherein said processor is to cause said first ASP to generate and transmit said message to said second ASP, said reason includes a reason corresponding to said first wireless communication device for closing said ASP-session.

17. The system of claim 12, wherein said processor is configured to cause said first ASP to process said message received from said second ASP, said reason includes a reason corresponding to said second wireless communication device for closing said ASP-session.

18. A method comprising:
managing an Application Service Platform (ASP) session (ASP-session) between a first device including a first ASP and a second device including a second ASP via a wireless Peer-to-Peer (P2P) connection over a P2P link; and
communicating a message via the wireless P2P connection between said first ASP and said second ASP to close said ASP-session, the message comprising:
an Opcode field having a size of one octet and set to a value 0x03;
a sequence number field having a size of one octet and comprising a sequence number assigned at transmission time;
a session mac field having a size of six octets and comprising a session Media Access Control (MAC) address;
a session id field having a size of four octets and comprising a session identifier (id); and
a reason field having a size of one octet and comprising an indication of a reason for closing said ASP-session.

19. The method of claim 18, wherein said reason field includes a value selected from a predefined set of values representing a predefined set of reasons for closing said ASP-session.

20. The method of claim 18, wherein said reason comprises a reason selected from the group consisting of rejected by user, advertised service is not available, system failure, and P2P link is not available.

21. The method of claim 18, wherein said session MAC address and said session identifier are included in a request-session message communicated between said first ASP and said second ASP prior to establishing said ASP-session.

22. A product including a non-transitory storage medium having stored thereon instructions that, when executed by a machine, result in:
managing an Application Service Platform (ASP) session (ASP-session) between a first device including a first ASP and a second device including a second ASP via a wireless Peer-to-Peer (P2P) connection over a P2P link; and
communicating a message via the wireless P2P connection between said first ASP and said second ASP to close said ASP-session, the message comprising:
an Opcode field having a size of one octet and set to a value 0x03;
a sequence number field having a size of one octet and comprising a sequence number assigned at transmission time;
a session mac field having a size of six octets and comprising a session Media Access Control (MAC) address;
a session id field having a size of four octets and comprising a session identifier (id); and
a reason field having a size of one octet and comprising an indication of a reason for closing said ASP-session.

23. The product of claim 22, wherein said reason field includes a value selected from a predefined set of values representing a predefined set of reasons for closing said ASP-session.

24. The product of claim 22, wherein said reason comprises a reason selected from the group consisting of rejected by user, advertised service is not available, system failure, and P2P link is not available.

25. The product of claim 22, wherein said session MAC address and said session identifier are included in a request-session message communicated between said first ASP and said second ASP prior to establishing said ASP-session.

26. The product of claim 22, wherein said instructions result in generating and transmitting said message to said second ASP, said reason includes a reason corresponding to said first device for closing said ASP-session.

27. The product of claim 22, wherein said instructions result in processing said message received from said second ASP, said reason includes a reason corresponding to said second device for closing said ASP-session.

28. The product of claim 27, wherein said instructions result in providing a session status message to a service on said first device, said session status message indicating said reason.

29. The product of claim 22, wherein said message comprises an ASP coordination protocol message.

30. The product of claim 22, wherein said message comprises a remove-session message.

* * * * *

UNITED STATES PATENT AND TRADEMARK OFFICE
CERTIFICATE OF CORRECTION

| | | |
|---|---|---|
| PATENT NO. | : 9,635,112 B2 | |
| APPLICATION NO. | : 14/013153 | |
| DATED | : April 25, 2017 | |
| INVENTOR(S) | : Emily H. Qi et al. | |

It is certified that error appears in the above-identified patent and that said Letters Patent is hereby corrected as shown below:

In the Claims

In Column 20, Line 53, in Claim 12, delete "a. wherein" and insert -- wherein --, therefor.

In Column 21, Line 12, in Claim 15, delete "said wherein said" and insert -- wherein said --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*